US012596197B1

(12) United States Patent (10) Patent No.: US 12,596,197 B1
Krishnan et al. (45) Date of Patent: Apr. 7, 2026

(54) SYSTEM FOR MITIGATION OF SENSOR VEILING GLARE

(71) Applicant: AMAZON TECHNOLOGIES, INC., Seattle, WA (US)

(72) Inventors: Aravindhan Kumarasamy Krishnan, San Jose, CA (US); Shreekant Gayaka, Fremont, CA (US); Isabella Talley Lewis, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 996 days.

(21) Appl. No.: 17/663,719

(22) Filed: May 17, 2022

(51) Int. Cl.
 *G01S 17/894* (2020.01)
 *G01S 7/48* (2006.01)
 *G01S 17/32* (2020.01)
 *G01S 17/46* (2006.01)

(52) U.S. Cl.
 CPC .......... *G01S 17/894* (2020.01); *G01S 7/4802* (2013.01); *G01S 7/4808* (2013.01); *G01S 17/32* (2013.01); *G01S 17/46* (2013.01)

(58) Field of Classification Search
 CPC ...... G01S 17/894; G01S 17/46; G01S 7/4808; G01S 7/4802; G01S 17/32
 USPC ....................................................... 356/4.01
 See application file for complete search history.

(56) References Cited

U.S. PATENT DOCUMENTS 8,218,868 B2 * 7/2012 Stern ......................... G06T 5/40
           382/254
11,536,804 B2 * 12/2022 Fisher ................... G01S 7/4863

OTHER PUBLICATIONS

"Time-of Flight high accuracy proximity sensor", ST Datasheet, VL53L4CD, DS13812—Rev 3—Jan. 2022, www.st.com, STMicroelectronics 2022, 37 pages.
Tomic, et al., "Practical Assessment of Veiling Glare in Camera Lens System", Professional paper, UDK: 655.22, 778.18, 681.7. 066, Journal of Graphic Engineering and Design, vol. 5 (2), 2014, pp. 23-28.

* cited by examiner

*Primary Examiner* — Daniel L Murphy
(74) *Attorney, Agent, or Firm* — Lindauer Law, PLLC

(57) ABSTRACT

An autonomous mobile device (AMD) may use an indirect time of flight (iTOF) sensor to acquire depth information about a physical space. This sensor may experience veiling glare in which multipath interference results in incorrect output of false objects that are not actually present in the physical space. A frame of depth data from the iTOF sensor is processed to determine if veiling glare may be present. A frame with possible veiling glare is then filtered at a pixel level to provide filtered depth data by removing or replacing depth data from pixels that may exhibit veiling glare. These pixels are determined to exhibit veiling glare by comparing their amplitude data with amplitude thresholds associated with an observed distance of that pixel and a specified error tolerance. The filtered data may then be used to operate the AMD.

20 Claims, 9 Drawing Sheets

300

PIXEL AMPLITUDE RATIO THRESHOLD DATA 148

| OBSERVED DISTANCE 302 | AMPLITUDE RATIO, DISTANCE ERROR DATA PAIRS 304 | PIXEL AMPLITUDE RATIO THRESHOLD VALUE 306 |
|---|---|---|
| D1 | (AR11, E11), (AR12, E12), (AR13, E13) | MIN(A1I) FOR E1I >= DELTA |
| D2 | (AR21, E21), (AR22, E22), (AR23, E23) | MIN(A2I) FOR E2I >= DELTA |
| D3 | (AR31, E31), (AR32, E32), (AR33, E33) | MIN(A3I) FOR E3I >= DELTA |
| ... | ... | ... |

THRESHOLD SHIFT DATA 320

| ESTIMATED VEILING GLARE DISTANCE 322 | SHIFT VALUE 324 |
|---|---|
| 0.20 | 70 |
| 0.50 | 55 |
| 0.80 | 40 |
| 1.10 | 25 |
| 1.4 | 10 |
| ... | ... |

FIG. 3

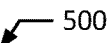

DETERMINE PIXEL AMPLITUDE RATIO
THRESHOLD DATA
502

ACQUIRE FIRST DATA USING AN INDIRECT
TIME OF FLIGHT SENSOR
504

DETERMINE THE FIRST DATA INCLUDES
POSSIBLE VEILING GLARE
506

DETERMINE A FIRST PERCENTAGE OF
PIXELS THAT HAVE AN AMPLITUDE
GREATER THAN A BRIGHT THRESHOLD
AMPLITUDE VALUE AND A DISTANCE THAT
IS LESS THAN A NEAR THRESHOLD
DISTANCE
522

DETERMINE THE FIRST PERCENTAGE OF
PIXELS THAT IS GREATER THAN A
THRESHOLD 524

DETERMINE SECOND DATA BASED ON
FILTERING INDIVIDUAL PIXELS OF THE FIRST
DATA USING THE PIXEL AMPLITUDE RATIO
THRESHOLD DATA
508
(SEE FIG. 6)

OPERATE THE AMD BASED ON THE
SECOND DATA
510

FIG. 5

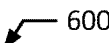

600

DETERMINE AN ESTIMATED VEILING GLARE
DISTANCE BASED ON THE FIRST DATA
602

DETERMINE A FIRST SET OF PIXELS OF THE
FIRST DATA THAT HAVE AN AMPLITUDE
GREATER THAN A BRIGHT THRESHOLD
AMPLITUDE VALUE AND A DISTANCE THAT
IS LESS THAN A NEAR THRESHOLD
DISTANCE
622

DETERMINE THE ESTIMATED VEILING
GLARE DISTANCE BASED ON THE FIRST SET
OF PIXELS 624

DETERMINE ESTIMATED VEILING GLARE
AMPLITUDE ASSOCIATED WITH THE FIRST
DATA
604

DETERMINE A MEASURED VEILING
AMPLITUDE
652

DETERMINE SECOND DATA USING PIXEL-
LEVEL FILTERING
606
(SEE FIG. 7)

DETERMINE, BASED ON THE MEASURED
VEILING AMPLITUDE, AN AMPLITUDE
SCALING FACTOR 654

FILTERED DEPTH IMAGE DATA 154

DETERMINE THE ESTIMATED VEILING
GLARE AMPLITUDE BASED ON THE FIRST
DATA AND THE AMPLITUDE SCALING
FACTOR 656

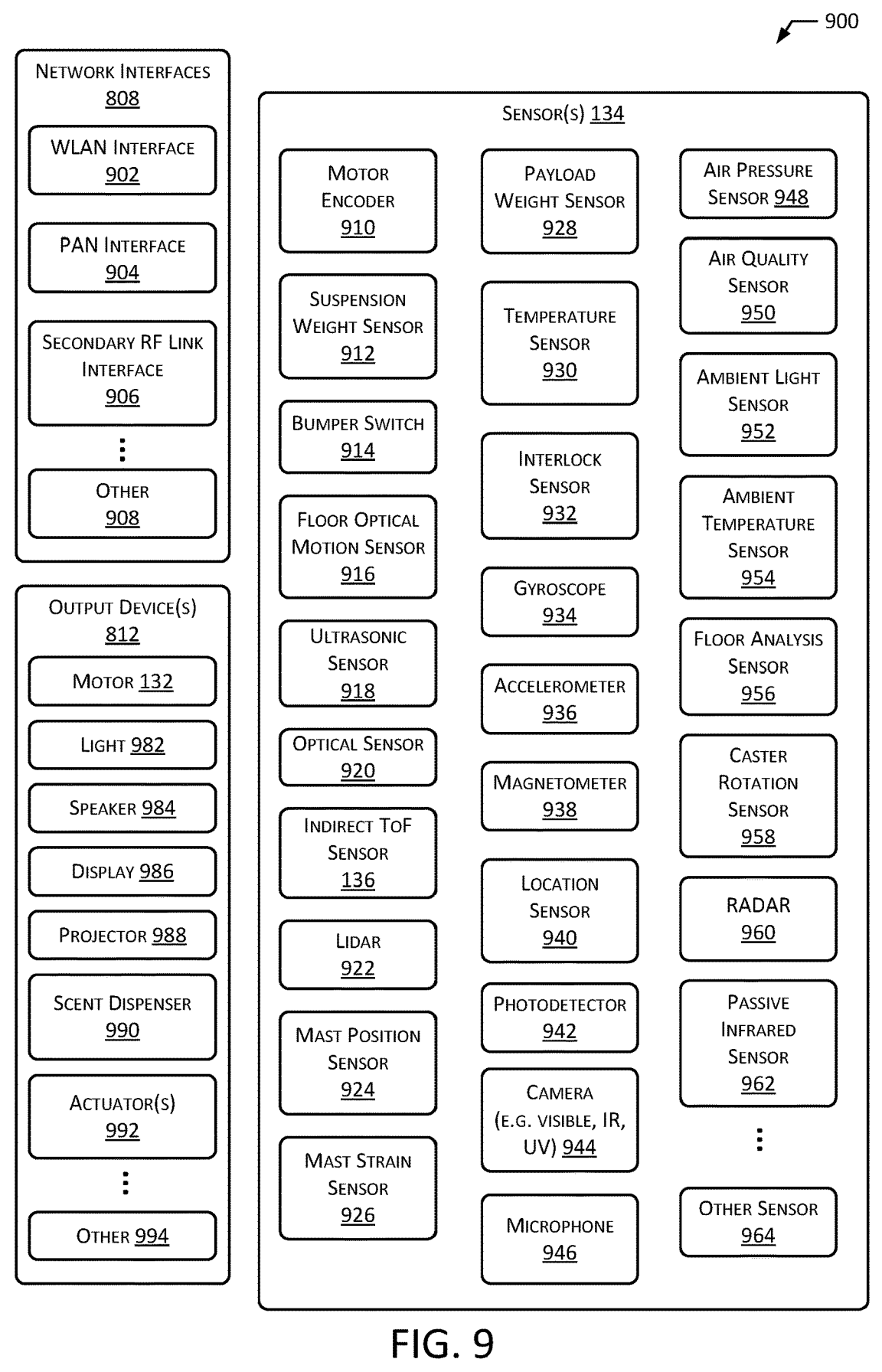

NETWORK INTERFACES 808

WLAN INTERFACE 902

PAN INTERFACE 904

SECONDARY RF LINK INTERFACE 906

⋮

OTHER 908

OUTPUT DEVICE(S) 812

MOTOR 132

LIGHT 982

SPEAKER 984

DISPLAY 986

PROJECTOR 988

SCENT DISPENSER 990

ACTUATOR(S) 992

⋮

OTHER 994

SENSOR(S) 134

MOTOR ENCODER 910

SUSPENSION WEIGHT SENSOR 912

BUMPER SWITCH 914

FLOOR OPTICAL MOTION SENSOR 916

ULTRASONIC SENSOR 918

OPTICAL SENSOR 920

INDIRECT ToF SENSOR 136

LIDAR 922

MAST POSITION SENSOR 924

MAST STRAIN SENSOR 926

PAYLOAD WEIGHT SENSOR 928

TEMPERATURE SENSOR 930

INTERLOCK SENSOR 932

GYROSCOPE 934

ACCELEROMETER 936

MAGNETOMETER 938

LOCATION SENSOR 940

PHOTODETECTOR 942

CAMERA (E.G. VISIBLE, IR, UV) 944

MICROPHONE 946

AIR PRESSURE SENSOR 948

AIR QUALITY SENSOR 950

AMBIENT LIGHT SENSOR 952

AMBIENT TEMPERATURE SENSOR 954

FLOOR ANALYSIS SENSOR 956

CASTER ROTATION SENSOR 958

RADAR 960

PASSIVE INFRARED SENSOR 962

⋮

OTHER SENSOR 964

FIG. 9

SYSTEM FOR MITIGATION OF SENSOR VEILING GLARE

INCORPORATION BY REFERENCE OF COMPUTER PROGRAM LISTING APPENDIX

This disclosure incorporates by reference the material submitted in the Computer Program Listing Appendix filed herewith.

BACKGROUND

An autonomous mobile device (AMD) moves throughout a physical space. To facilitate this movement, the AMD uses sensors to gather information about the physical space.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 3 illustrates pixel amplitude ratio threshold data and threshold shift data to determine the filtered depth image data, according to some implementations.

FIGS. 5-7 illustrate flow diagrams of a process to determine filtered depth image data, according to some implementations.

FIG. 9 is a block diagram of some components of the AMD, such as network interfaces, sensors, and output devices, according to some implementations.

Figure 1:
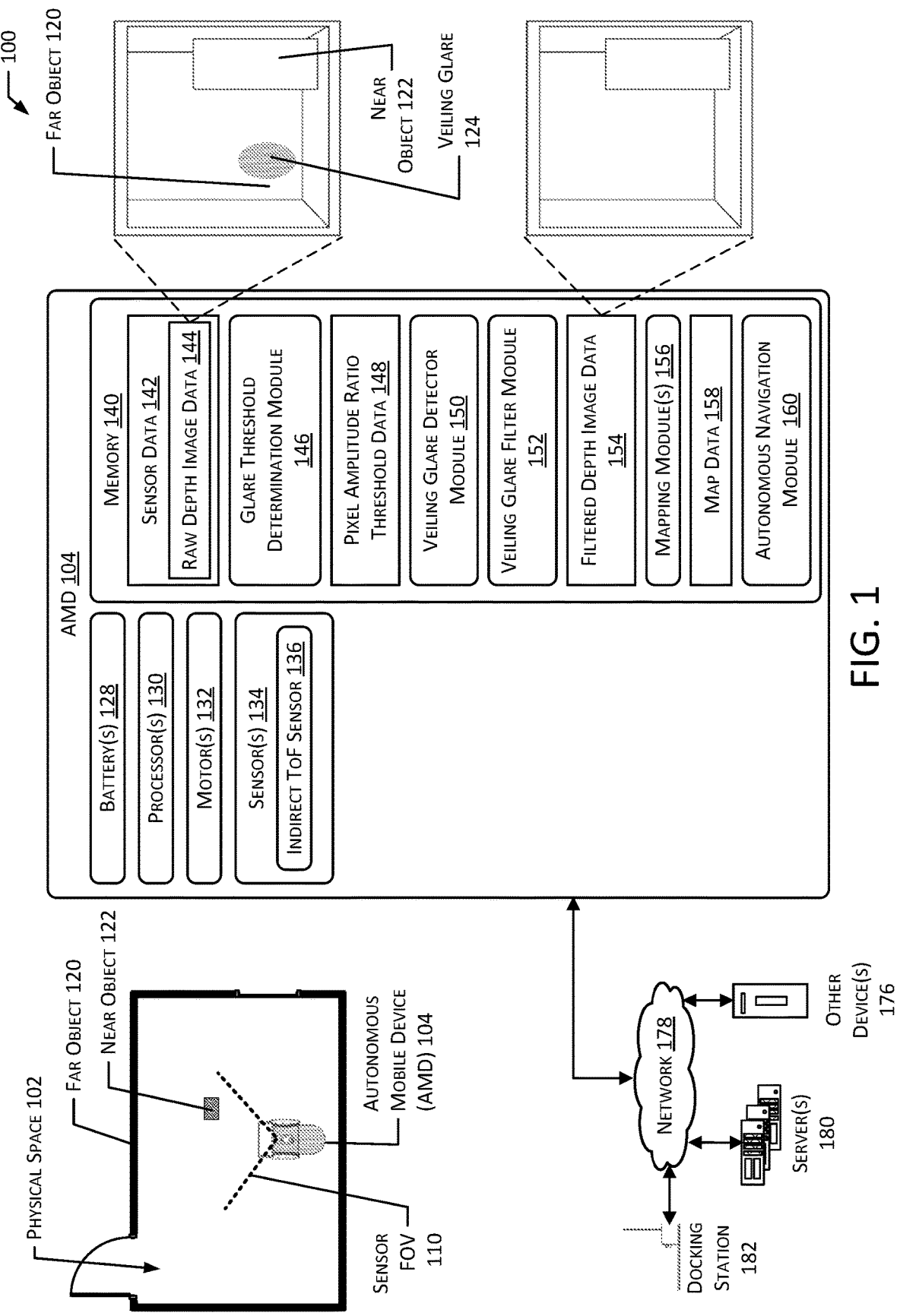
FIG. 1 illustrates a system for determining veiling glare in depth image data and filtering the veiling glare to determine filtered depth image data at an autonomous mobile device (AMD), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of performing tasks. These tasks may include autonomous movement in which the AMD moves between locations in a physical space without being driven or controlled by a user. Autonomous movement uses information about the physical space acquired using sensors such as an indirect time of flight (iTOF) sensor. An iTOF sensor illuminates a scene with light having a known phase. That light may be reflected by objects in the scene back to a camera. Output from the camera is used to determine an observed phase and observed amplitude of that reflected light. By finding the difference between the known phase and the observed phase, it is possible to determine an observed distance between the iTOF sensor and the object. The resulting depth image data may be visualized as a picture of the scene, but instead of color each pixel provides information about a distance.

The use of iTOF sensors provides several advantages compared to other techniques. For example, iTOF sensors may be relatively compact, allowing for their use in AMDs with smaller form factors. Compared to lidar, iTOF sensors are less costly and may provide more points of data, resulting in a greater spatial resolution of the scene. The greater spatial resolution may provide additional information that helps distinguish one object from another.

However, iTOF sensors may be prone to veiling glare in which an object is falsely detected. Veiling glare is caused by indirect reflection of light from a nearby bright (or relatively reflective) object illuminating more than one light sensing element in the camera. These indirect reflections may result from internal reflections within multiple element lenses, particular design of the camera, and so forth. If the output from the iTOF sensor includes veiling glare, and thus a false object, the operation of the AMD may be adversely affected. For example, if the floor produces a veiling glare and resulting false object, the AMD may be unable to move as it is programmed to not collide with an object. In another example, veiling glare may obscure details that would otherwise be used by the AMD to determine where it is in the physical space.

Described in this disclosure are techniques and systems that mitigate veiling glare in the output from an iTOF sensor. The iTOF sensor provides raw depth image data comprising a plurality of pixels, with each pixel having an observed amplitude and an observed distance. A phase difference between an emitted phase of the illumination and an observed phase is used to determine the observed distance. It is understood that observed distance and observed phase may be used interchangeably.

A frame of raw depth image data may be processed to determine if veiling glare may be present. For example, a percentage of pixels in the frame that have an observed amplitude exceeding a first threshold and an observed distance less than a threshold value may be calculated. If that percentage exceeds a second threshold, additional filtering may be performed as described.

The frame of raw depth image data that has been determined to potentially have veiling glare present is then filtered at a per-pixel level. Pixels are filtered using a pixel amplitude ratio threshold that is retrieved from previously determined pixel amplitude ratio threshold data. The pixel amplitude ratio threshold data provides information about amplitude thresholds associated with different observed distances and given a specified distance error value that indicates a maximum amount of error in the distances that are determined that is to be tolerated. This results in a dynamic filter in which different pixels may be assessed with different threshold values.

Based on the comparison, candidate pixels determined to be experiencing veiling glare may in some implementations be assessed to determine if they are representative of a curved surface. Actual surfaces may be flat, while veiling glare will manifest as a curved surface. As a result, the candidate pixels that are deemed to be representative of a flat surface may be considered not to include veiling glare and may be included in the filtered depth image data. In comparison, candidate pixels that are deemed to be representative of a curved surface may be designated as veiling glare pixels. These veiling glare pixels may be removed or omitted from the filtered depth image data.

By performing the per-pixel filtering using the pixel amplitude ratio threshold data, the system is able to effectively mitigate veiling glare in many different scenarios. By filtering out the pixels that are deemed to exhibit veiling glare, the resulting filtered depth image data provides information about the physical space that does not include the false objects. As a result, operation of the AMD is improved. For example, by using the filtered depth image data the AMD is able to perform path planning for autonomous movement without the false object presenting an obstacle to movement.

ILLUSTRATIVE SYSTEM

FIG. 1 illustrates a system 100 for determining veiling glare in depth image data about a physical space 102 with an AMD 104, according to some implementations.

The AMD 104 may include one or more batteries 128, one or more processors 130, one or more motors 132, sensors 134, and memory 140. Other components of the AMD 104 are discussed with regard to FIG. 8.

The AMD 104 uses the sensors 134 to acquire sensor data 142 about the physical space 102. For example, the sensors 134 may include one or more indirect time of flight (iTOF) sensors 136, image sensors, and so forth. The corresponding sensor data 142 may include point cloud data and image data. For example, the iTOF sensor 136 may provide as output raw depth image data 144 comprising a plurality of pixels with data indicative of one or more of an observed amplitude or observed distance for each pixel. Additional sensors 134 are discussed with regard to FIG. 9. The sensor data 142 may be stored in the memory 140.

The iTOF sensor 136 has a field of view (FOV) 110. The FOV 110 is the extent of a scene of the physical space 102 that is represented by sensor data 142 acquired using one or more sensors 134. In the physical space 102 there may be objects at various distances, such as far objects 120 and near objects 122. For example, a far object 120 may be greater than 50 centimeters (cm) from the iTOF sensor 136, while a near object 122 is less than or equal to 50 cm.

During operation, the raw depth image data 144 may provide information about objects in the FOV 110. This may include information about the far objects 120 and the near objects 122 in the scene. However, in some circumstances veiling glare 124 may be present in the raw depth image data 144. The veiling glare 124 may appear to be a false object that is near the AMD 104. If not mitigated, the presence of the veiling glare 124 in the raw depth image data 144 may impair operation of the AMD 104. For example, the false object presented by the veiling glare 124 may result in the AMD 104 being unable to move due to an attempt to avoid collision with the false object. The phenomena of veiling glare is discussed in more detail with respect to FIG. 2.

One or more modules may be stored in the memory 140. In some implementations, these modules may comprise instructions that are executed by the one or more processors 130. In other implementations, the modules may comprise hardware configured to perform the operations described.

A glare threshold determination module 146 may determine pixel amplitude ratio threshold data 148. In one implementation, the glare threshold determination module 146 may utilize a simulation in which various combinations of simulated veiling glare vectors and simulated ground truth vectors having the same phase but different respective amplitudes are used. Because the characteristics of these vectors are specified, the resulting phase errors (and thus distance errors) may be calculated. The phase errors (and thus distance errors) also vary as a function of the difference in the amplitudes of the simulated veiling glare vectors and simulated ground truth vectors. For the various combinations of summed simulated veiling glare vectors and simulated ground truth vectors, an amplitude ratio respective of the amplitude of the simulated ground truth vector and the simulated veiling glare amplitude may be calculated. From data associated with the various pairs of simulated veiling glare vectors and simulated ground truth vectors for a given observed distance, a minimum value of amplitude ratio that is associated with a minimum distance error may be determined and used as a pixel amplitude ratio threshold value. The pixel amplitude ratio threshold data 148 may then comprise an observed distance and the pixel amplitude ratio threshold value. This is discussed in more detail with regard to FIG. 3.

In some implementations, the size of the pixel amplitude ratio threshold data 148 that is stored in the memory 140 may be reduced by storing a subset of the data and applying a threshold shift to provide a representation of the pixel amplitude ratio threshold values for different veiling glare distances. This is discussed with regard to FIGS. 3-4.

In some implementations, the glare threshold determination module 146 may be executed on one or more servers 180 or other devices and may be omitted from the AMD 104. The pixel amplitude ratio threshold data 148 may be sent to the AMD 104, stored in the memory 140, and so forth.

A veiling glare detector module 150 accepts as input a frame of raw depth image data 144 and determines if veiling glare 124 may be present in the frame. For example, a frame may comprise a set of pixels and their associated data that are acquired during a particular time interval. In one implementation, a percentage of pixels in the frame that have an observed amplitude exceeding a first threshold and an observed distance less than a threshold value may be calculated. If that percentage exceeds a threshold, additional filtering may be performed as described. If not, the raw depth image data 144 may be used without further processing. This is discussed in more detail with regard to FIG. 5. In some implementations, the veiling glare detector module 150 may be omitted and all frames may be processed by the veiling glare filter module 152.

A veiling glare filter module 152 may accept as input a frame of the raw depth image data 144 deemed by the veiling glare detector module 150 to include veiling glare 124 and provide as output filtered depth image data 154. As illustrated here, the filtered depth image data 154 omits the veiling glare 124. The veiling glare filter module 152 may also utilize the pixel amplitude ratio threshold data 148 during operation. The veiling glare filter module 152 may perform a per-pixel analysis of pixels in the input frame. Each pixel may have a different threshold value determined based on characteristics of the frame and the data associated with the individual pixel. Operation of the veiling glare filter module 152 is discussed in more detail with regard to FIGS. 6-7.

The filtered depth image data 154 may be provided as input to other modules, such as one or more mapping modules 156. The mapping modules 156 may provide as output map data 158. The map data 158 may comprise a representation of the physical space 102 that includes the objects such as the far objects 120, near objects 122, and their locations in the physical space 102. During operation, the mapping module(s) 156 may use the sensor data 142 to determine information such as where the AMD 104 is, how far the AMD 104 has moved, the presence and location of different types of objects, and so forth.

The mapping module(s) 156 may include a simultaneous localization and mapping (SLAM) module. Localization is determining where the AMD 104 is in the physical space 102 and may utilize some external reference. For example, cameras may acquire images. These images are processed to determine the presence of features in the images, such as edges of doors, shadows on the wall, texture on the walls, and so forth. In some implementations the filtered depth image data 154 may be used as input to the SLAM module.

The map data 158 may be implemented using any data structure that provides for storage and modification of data. For example, map data 158 may be managed by one or more arrays, one or more database records, one or more lists, one or more data objects, one or more graphs, and so forth.

An autonomous navigation module 160 provides the AMD 104 with the ability to navigate within the physical space 102 without real-time human interaction. The autonomous navigation module 160 may implement, or operate in conjunction with, the mapping module(s) 156. The autonomous navigation module 160 may generate path plan data that is indicative of a path through the physical space 102 from the current location to a destination location using the map data 158. The AMD 104 may then begin moving along the path.

The sensors 134 may continue to provide sensor data 142 during operation of the AMD 104. For example, filtered depth image data 154 may then be used by the mapping module(s) 156 to determine new or updated map data 158 that is used by the autonomous navigation module 160 or other systems.

The AMD 104 may use a network interface to connect to a network 178. For example, the network 178 may comprise a wireless local area network, that in turn is connected to a wide area network such as the Internet.

The AMD 104 may be configured to dock or connect to a docking station 182. The docking station 182 may provide external power which the AMD 104 may use to charge the battery 128 of the AMD 104.

The docking station 182 may also be connected to the network 178. For example, the docking station 182 may be configured to connect to the wireless local area network 178 such that the docking station 182 and the AMD 104 may communicate.

The AMD 104 may access one or more servers 180 via the network 178. For example, the AMD 104 may utilize a wakeword detection module to determine if a user is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user to one or more servers 180 for further processing. The servers 180 may process the spoken audio and return to the AMD 104 data that may be subsequently used to operate the AMD 104.

The AMD 104 may also communicate with other devices 176. The other devices 176 may include one or more devices that are within the physical space 102 such as a home or associated with operation of one or more devices in the physical space 102. For example, the other devices 176 may include a doorbell camera, a garage door opener, a refrigerator, washing machine, and so forth. In some implementations, the other devices 176 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

Figure 2:
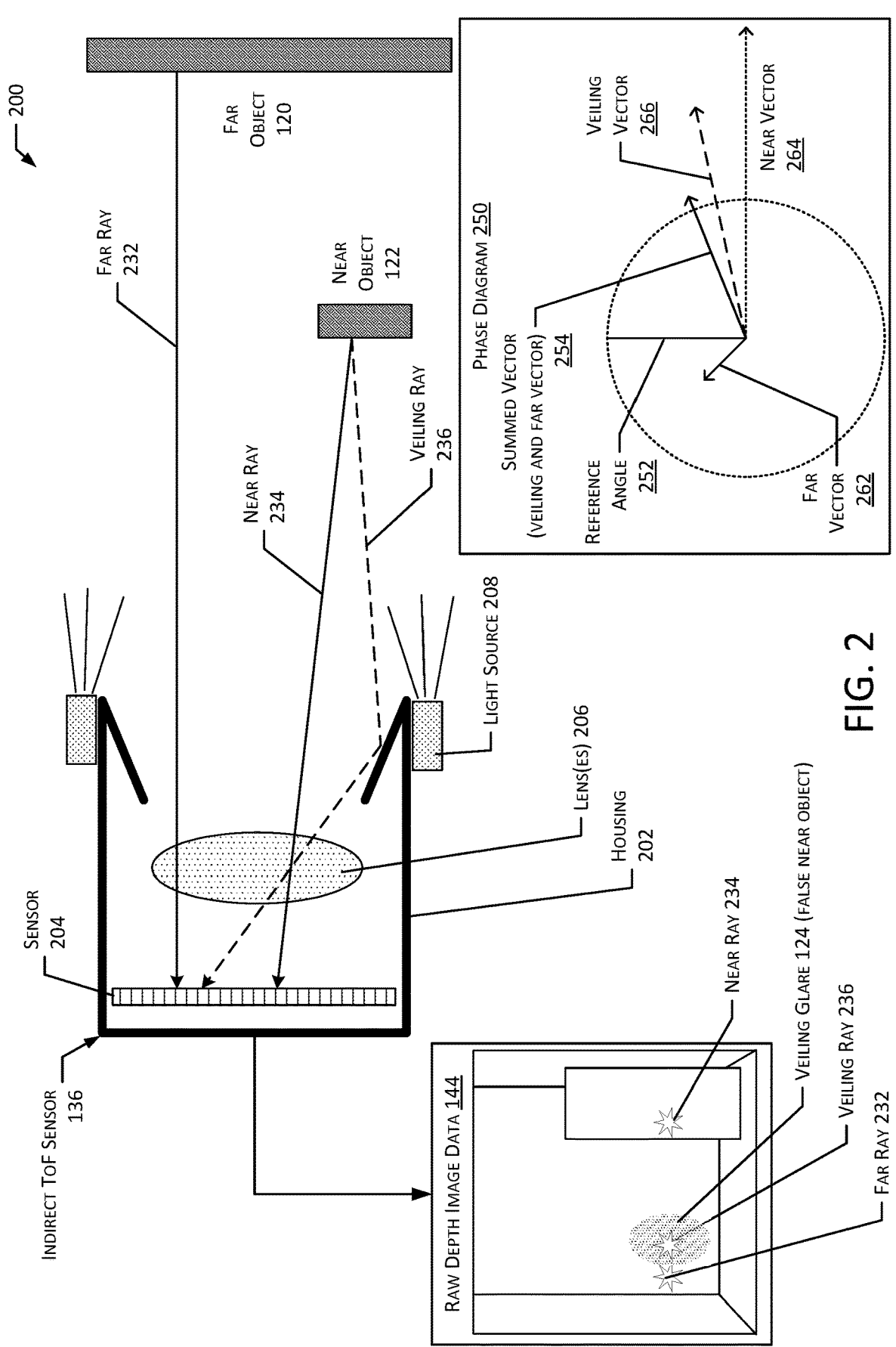
FIG. 2 illustrates an indirect time of flight sensor and veiling glare, according to some implementations.

FIG. 2 illustrates at 200 an iTOF sensor 136 and veiling glare 124, according to some implementations. An iTOF sensor 136 is shown comprising a housing 202, a sensor 204, a lens 206, and light sources 208. The sensor 204 may comprise an array of detectors. The sensor 204 may comprise a complementary metal oxide (CMOS) device, charge coupled device (CCD), and so forth. A single lens 206 is depicted for ease of illustration, and not necessarily as a limitation. For example, the iTOF sensor 136 may comprise a multi-lens system. During operation, circuitry (not shown) provides as output raw depth image data 144. In this illustration, the raw depth image data 144 includes veiling glare 124 that appears as a false close object. The raw depth image data 144 in this illustration is discussed in more detail below.

During operation, the iTOF sensor 136 operates the light sources 208 to flood the scene within the FOV 110 with light having a specified phase. For example, the light sources 208 may emit light having a sine waveform. The emitted phase indicates a first time at which an amplitude of the emitted sine wave is at a peak. Light that is reflected from objects in the scene may return and impinge on the sensor 204. This reflected light exhibits an observed phase, having a peak at a second time. The difference between the emitted phase and the observed phase may be used to determine a distance.

For clarity of illustration, single rays of reflected light are shown. This illustration depicts a far ray 232 that extends from the far object 120 to the sensor 204. This far ray 232 may result from the far object 120 reflecting at least a portion of the emitted light from the light sources 208. Also shown is a near ray 234 that extends from the near object 122 to the sensor 204.

Also depicted is a veiling ray 236 that may result from the near object 122 reflecting at least a portion of the emitted light from the light sources 208. The veiling ray 236 extends from the near object 122 and is reflected by a portion of the housing 202 onto the sensor 204 at a location proximate to where the far ray 232 impinges on the sensor 204. The veiling ray 236 results in veiling glare 124, in which a false near object appears to be present in the scene.

Returning to the raw depth image data 144, star shapes are used to illustrate the individual points corresponding to a respective ray. For example, a depiction of the far ray 232, the near ray 234, and the veiling ray 236 are shown. The veiling glare 124 resulting from a plurality of veiling rays 236 (not shown) impinging on the sensor 204 creates the appearance of a false object that is relatively close to the iTOF sensor 136.

A phase diagram 250 is also depicted with a reference angle 252. In this diagram, phase angle is relative to the reference angle 252 and phase amplitude is indicated by length. The far ray 232 is associated with a far vector 262, the near ray 234 is associated with a near vector 264, and a veiling ray 236 is associated with a veiling vector 266. Also shown is a summed vector 254 resulting from a sum of the far vector 262 and the veiling vector 266.

The veiling vector 266 has an associated veiling glare phase or equivalent veiling glare distance that is representative of its path from the near object 122 to the sensor 204. As shown here, the veiling vector 266 has an amplitude that is greater than the far vector 262. During operation of the sensor 204 if the far ray 232 and the veiling ray 236 impinge on the same sensing element, they will both contribute to the resulting output. The resulting pixel in the raw depth image data 144 will be representative of the summed vector 254. Instead of a pixel that indicates an observed distance to the far object 120, the pixel reports an observed distance that is based on the phase of the summed vector 254, manifesting the veiling glare 124.

FIG. 3 illustrates at 300 the pixel amplitude ratio threshold data 148 and threshold shift data 320 that may be used to determine the filtered depth image data 154, according to some implementations.

The glare threshold determination module 146 may utilize a simulation in which various combinations of simulated veiling glare vectors and simulated ground truth vectors having the same phase but different respective amplitudes are determined. Given a specified observed distance 302, the simulation may process ranges of possible phases and amplitudes for both simulated veiling glare vectors and simulated ground truth vectors. For example, a veiling glare vector may be set to a unit magnitude and arbitrary phase. The magnitude of the simulated ground truth vector may be varied in the range of [0,1] and the phase varied in the range of [0, 360]. The resulting simulated observed vectors, corresponding to the summed vectors 254, are computed and the corresponding phase (distance) errors are stored. This results in data indicative of observed distances and corresponding distance errors and amplitude ratios.

Because the characteristics of these vectors are specified in the simulation, the resulting phase errors (and thus distance errors) may be calculated. The phase errors (and thus distance errors) also vary as a function of the difference in the amplitudes of the simulated veiling glare vectors and simulated ground truth vectors. This results in amplitude ratio and distance error data pairs 304 for a given observed distance 302, comprising pairs of particular amplitude ratios and associated distance errors. For example, each distance d1, d2, d3, . . . , di has an associated set of data pairs 304. For example, distance d1 has a set of data pairs (ar11, e11), (ar12, e12), (ar13, e13), . . . each data pair corresponding to a different amplitude ratio and distance error value. The distance error value indicates a maximum amount of error in the determined distances that is to be tolerated. From this set of data pairs 304, a pixel amplitude ratio threshold value 306 may be determined as the minimum amplitude ratio for a distance error value that is to be tolerated. For example, given a target distance error "delta", the minimum amplitude ratio may be determined as shown. The pixel amplitude ratio threshold values 306 are indicative of a minimum amplitude ratio that results in a distance error value that is less than a specified maximum distance error value.

The particular curves that describe these threshold values may repeat as some multiple of observed distance or observed phase. This is depicted with regard to FIG. 4. In some implementations, to minimize the size of data stored within the memory 140, a subset of the pixel amplitude ratio threshold data 148 may be stored and threshold shift data 320 is stored and used to apply a threshold shift to accommodate different veiling glare distances. The threshold shift data 320 may comprise data indicative of a particular estimated veiling glare distance 322 and an associated shift value 324. Given a particular estimated veiling glare distance 322, a shift value 324 may be retrieved and subsequently used to modify the pixel amplitude ratio threshold data 148 to determine the pixel amplitude ratio threshold value 306.

Figure 4:
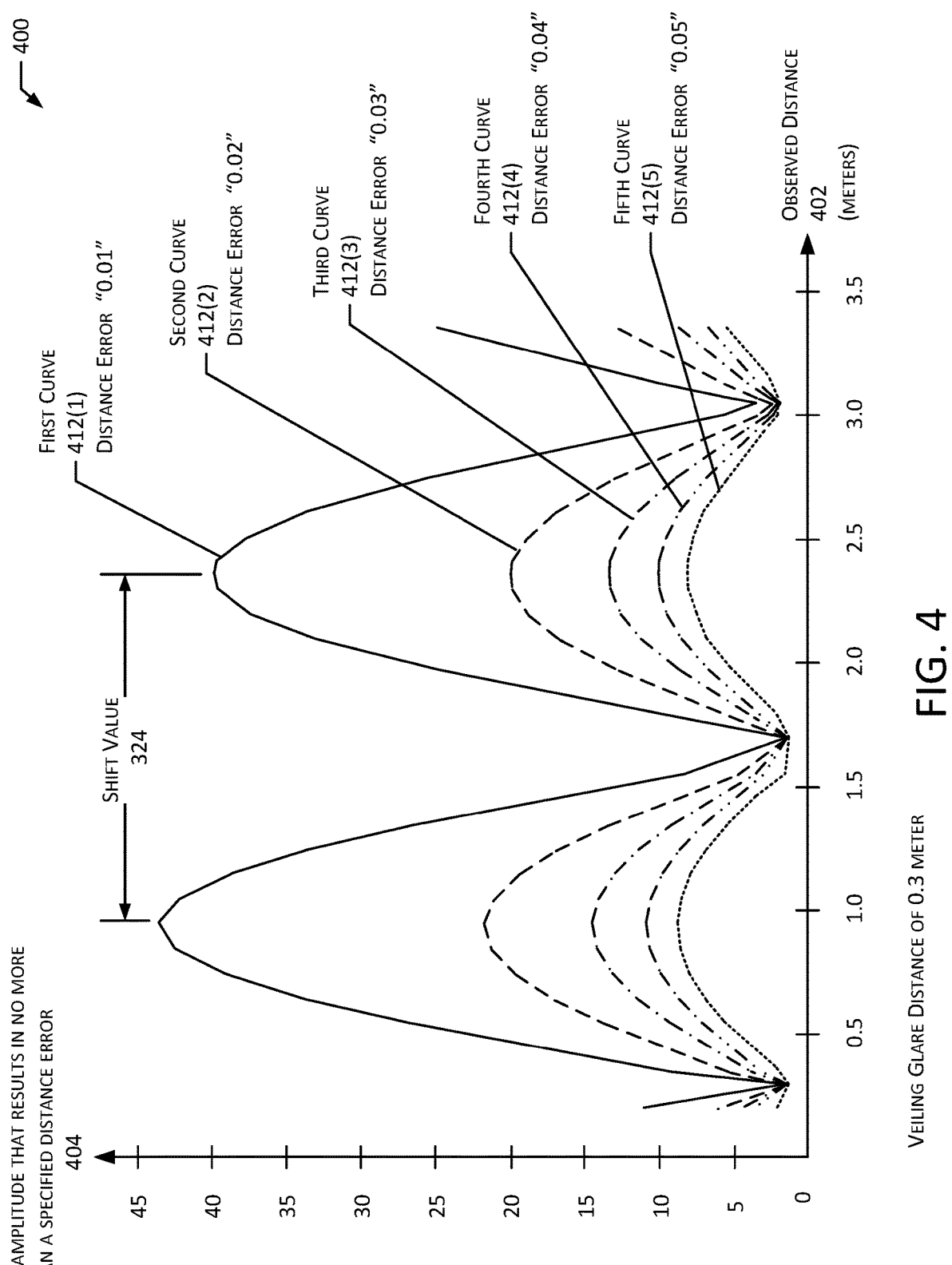
FIG. 4 illustrates a graph of minimum amplitudes for a specified distance error and given a specified veiling glare distance, according to one implementation.

FIG. 4 illustrates a graph 400 of minimum amplitudes for observed distances and given a specified veiling glare distance, according to one implementation. In this graph 400, the veiling glare distance is specified at 0.3 meters. In this graph 400, the horizontal axis is indicative of observed distance 402 while a vertical axis 404 indicates a minimum amplitude that results in no more than the specified distance error for a particular curve 412. Also depicted are curves 412(1)-(5) delineating the relationship between the observed distance 402 and the minimum amplitude 404. Each curve 412 represents a different distance error that is tolerated. For example, the first curve 412(1) represents a tolerated distance error of 0.01 meters, while the fifth curve 412(5) represents a tolerated distance error of 0.05 meters.

While the horizontal axis is depicted as observed distance 402, the graph may alternatively be depicted with the horizontal axis indicating observed phase.

As shown in this graph 400, for a given veiling glare distance the minimum amplitude for any given observed distance 402 is relative to the tolerated distance error. For example, the minimum amplitude 404 for an observed distance 402 of 1 meter and a distance error of 0.01 meters may be approximately 43. In comparison, if the tolerated distance error is 0.05 meters, the minimum amplitude 404 is reduced to approximately 8.

The minimum amplitudes indicated by the curves 412 may be used to specify a particular pixel amplitude ratio threshold value 306 for specified conditions. To reduce the size of data stored in the memory 140, a representation of the respective curves 412 may be stored and a shift value 324 applied. For example, the first curve 412(1) may have a shift value 324 of 70, allowing use at various multiples to be determined. In some implementations, the stored pixel amplitude ratio threshold data 148 and the threshold shift data 320 may be determined to minimize errors. The shift value 324 may be determined empirically, by testing various tables and minimizing the differences in amplitude ratios between them.

FIG. 5 illustrates a flow diagram 500 of a process to determine filtered depth image data 154, according to some implementations. The process may be implemented at least as instructions executed by one or more processors.

At 502 pixel amplitude ratio threshold data 148 is determined comprising pixel amplitude ratio threshold values 306. For example, the glare threshold determination module 146 may be executed by a server 180 or other computing device to calculate the pixel amplitude ratio threshold data 148.

At 504 first data is acquired using an iTOF sensor 136. For example, a first frame of raw depth image data 144 may be acquired at a first time by an iTOF sensor 136 of the AMD 104.

At 506 the first data is determined to include possible veiling glare. For example, the frame may be deemed to possibly include veiling glare 124. In one implementation, at 522 a first percentage of pixels in the frame that have an observed amplitude exceeding a first threshold amplitude and that have an observed distance that is less than a near threshold distance may be calculated. The first percentage is thus representative of a percentage of pixels in the frame that are "bright and near" and thus likely to be associated with veiling glare 124. At 524, if the first percentage is greater than a threshold percentage value, the first data may be deemed to possibly include veiling glare 124.

At 508 second data is determined based on filtering individual pixels of the first data using the pixel amplitude ratio threshold data 148. For example, the veiling glare filter module 152 may determine the filtered depth image data 154. This is discussed in more detail with regard to FIG. 6.

At 510 the AMD 104 is operated based on the second data. For example, the filtered depth image data 154 may be used by one or more of the mapping module 156, the autonomous navigation module 160, and so forth to facilitate autonomous movement.

FIG. 6 illustrates a flow diagram 600 of a process to determine filtered depth image data 154, according to some implementations. The process may be implemented at least as instructions executed by one or more processors.

At 602 an estimated veiling glare distance 322 based on the first data is determined. In other implementations, not shown, an estimated veiling glare phase may be determined instead of, or in addition to, the estimated veiling glare distance 322.

To determine the estimated veiling glare distance 322, in one implementation at 622 a first set of pixels of the first data are determined. The first set of pixels may comprise pixels that have an observed amplitude exceeding a first threshold amplitude and that have an observed distance that is less than a near threshold distance. The first set of pixels may thus include those pixels that are "bright and near" and are likely to be associated with veiling glare 124.

At 624 an estimated veiling glare distance 322 is determined based on the first set of pixels. In one implementation, the estimated veiling glare distance 322 may be determined as an average distance of the first set of pixels. In another implementation, a set of phase vectors associated with distance in the first data may be determined. This set of phase vectors may then be averaged in the phase vector space. The resulting averaged phase vector may then be converted to a distance that is used as the estimated veiling glare distance 322.

At 626 the estimated veiling glare phase is determined based on the average distance of the first set of pixels. For example, the average distance may be converted to a phase value.

At 604 an estimated veiling glare amplitude of the first data is determined. In one implementation at 652 a measured veiling amplitude may be determined. An iTOF sensor 136 may be used to acquire first test depth image data of an open scene with no objects, objects that are nonreflective, or objects that are beyond a maximum distance of expected operation. A retroreflector may then be added to the scene and the iTOF sensor 136 is used to acquire second test depth image data that is affected by veiling glare 124. The first test depth image data is subtracted from the second test depth image data to remove background noise and determine differential test depth image data. A threshold amplitude is then selected that results in the retroreflector being removed from the differential test depth image data, resulting in the veiling glare 124 remaining.

At 654 an amplitude scaling factor is determined as a ratio of pixels associated with the retroreflector and pixels associated with the veiling glare 124 from the respective data. The amplitude scaling factor may be stored and subsequently used. In some implementations, one or more of the amplitude scaling factor, the pixel amplitude ratio threshold data 148, or the threshold shift data 320 may be determined by another device and then stored in the memory 140. In some implementations, the operations at 652 and 654 may be performed many times, with resulting data averaged or otherwise processed to determine the amplitude scaling factor. In some implementations, a grid search or parameter sweep may be used to determine the amplitude scaling factor.

At 656 the estimated veiling glare amplitude is determined based on the first data and the amplitude scaling factor. For example, an average amplitude of the first data or a portion thereof may be multiplied by the amplitude scaling factor to determine the estimated veiling glare amplitude. In one implementation the portion may comprise the first set of pixels of the first data determined at 622.

In some implementations (not shown), an estimated veiling vector is determined based on the estimated veiling glare phase and the estimated veiling glare amplitude. The estimated veiling vector may be used instead of, or in addition to, one or more of the estimated veiling glare phase or estimated veiling glare amplitude.

At 606 the second data is determined, based on the estimated veiling vector, using pixel-level filtering. This is discussed in more detail with regard to FIG. 7. For example, the second data may comprise the filtered depth image data 154.

Figure 7:
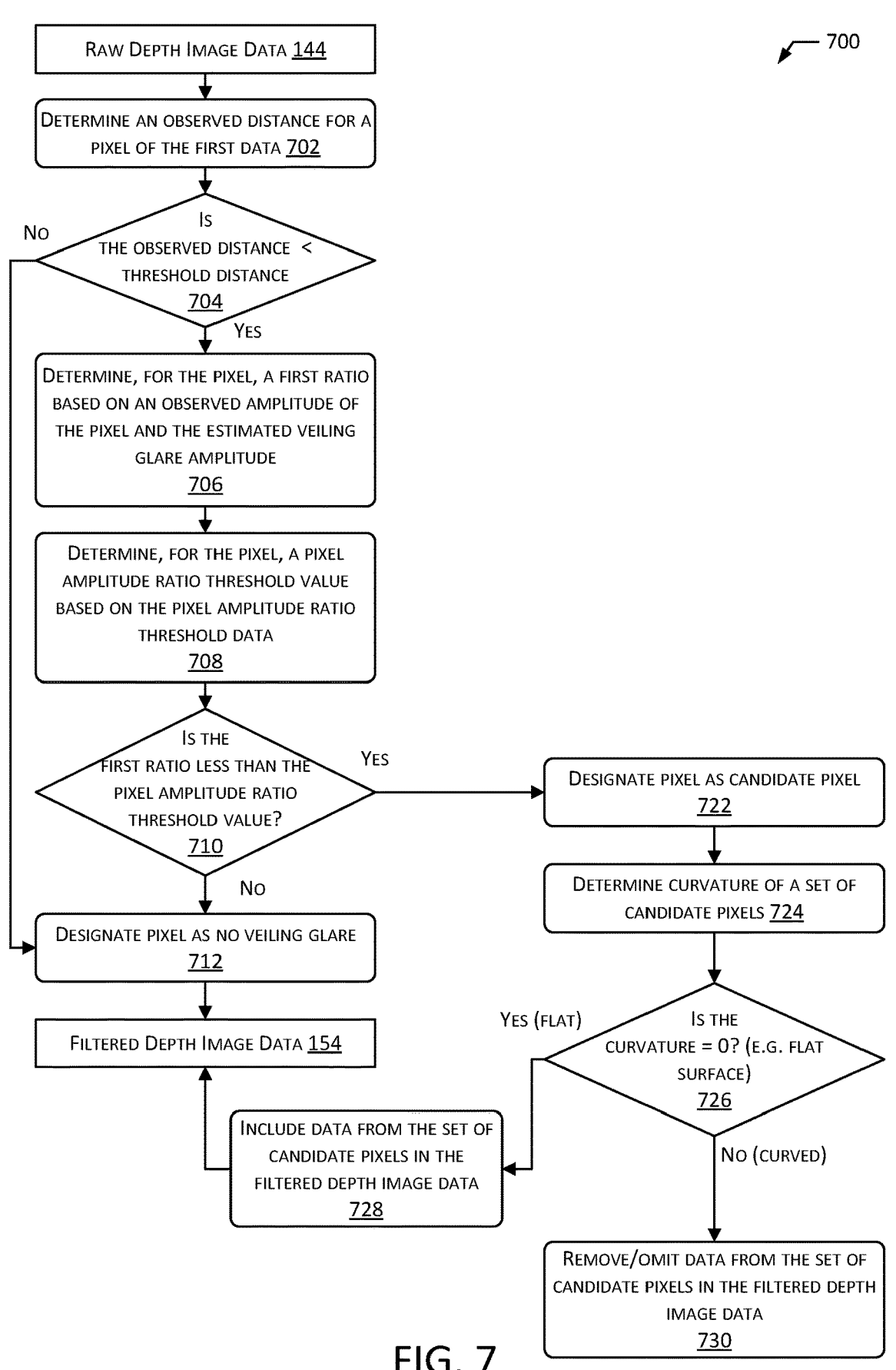

FIG. 7 illustrates a flow diagram 700 of a process to filter pixels to determine the filtered depth image data 154, according to some implementations. The process may be implemented at least as instructions executed by one or more processors.

Individual pixels of the raw depth image data 144, such as a frame of data acquired by the iTOF sensor 136 that that has been determined to possibly include veiling glare 124, is processed as described next. The process may be iterated to process at least a portion of the pixels of the raw depth image data 144.

At 702 an observed distance for a pixel of the first data is determined. For example, based on an observed phase difference an observed distance is determined.

At 704 a determination is made as to whether the observed distance of the pixel is less than a threshold distance. If yes, the process proceeds to 706. If no, the process proceeds to 712. In some implementations, the threshold distance may specify a maximum distance at which a veiling glare is deemed to be possible or subject to consideration. For example, the threshold distance may specify a maximum distance beyond which a pixel would not be deemed to exhibit veiling glare.

At 706 for the pixel, a first ratio is determined based on an observed amplitude of the pixel and the estimated veiling glare amplitude. The estimated veiling glare amplitude may be determined as described above with regard to 604.

At 708, for the pixel, a pixel amplitude ratio threshold value 306 is determined based on the pixel amplitude ratio threshold data 148. In one implementation, based on the observed distance 302 and a tolerated distance error, the pixel amplitude ratio threshold value 306 may be determined. In some implementations the determination may use a lookup table. In some implementations, the threshold shift data 320 may be used to shift the stored data to account for different estimated veiling glare distances 322 that are outside of a range of the observed distances 302 in the pixel amplitude ratio threshold data 148. For example, given an estimated veiling glare distance 322 a shift value 324 may be retrieved and used to adjust the pixel amplitude ratio threshold data 148 to determine a particular pixel amplitude ratio threshold value 306.

At 710 a determination is made as to whether the first ratio is less than the pixel amplitude ratio threshold value. If no, the process proceeds to 712. At 712, the pixel may be designated as not being subject to veiling glare 124, and the data associated with the pixel may be included in the filtered depth image data 154. For example, the observed distance 302 may be included in the filtered depth image data 154.

Returning to 710, if the first ratio is less than the pixel amplitude ratio threshold value 306, the process proceeds to 722. At 722 the pixel is designated as a candidate pixel.

At 724 a curvature value is determined for a set of candidate pixels. The curvature value is indicative of whether a set of observed distances associated with the set of candidate pixels are representative of a planar or non-planar surface. In one implementation, a Laplacian function may be used to determine the curvature of a set of candidate pixels based on the observed distance data of those pixels. For example, the Laplacian function may utilize the function "Laplacian( )" in the OpenCV library. The Laplacian function may utilize the Sobel operator during computation to determine a gradient of observed distances. In this implementation, the output of the Laplacian operator that is indicative of gradient of observed distances is used as the curvature value.

In other implementations other functions may be used. In some implementations the set of candidate pixels may comprise a single pixel. In other implementations, the set of candidate pixels may comprise pixels that are one or more of within a threshold pixel distance of one another, adjacent to one another, and so forth. For example, the set of candidate pixels may comprise pixels that form a contiguous grouping of adjacent pixels. In another example, the threshold pixel distance may specify all pixels that are within ten pixels of a specified pixel, with the distance specified as a radius, rectilinear distance, linear distance, and so forth. In some implementations the curvature value may be determined for concentric groupings of pixels.

At 726 a determination is made as to whether the curvature of the set of candidate pixels is equal to zero (flat) or non-zero (curved). Veiling glare 124 typically manifests as a curved false surface. As a result, if a set of points correspond to a flat surface, it is possible to have a high confidence that the flat surface is not the result of veiling glare 124. If equal to zero, the process proceeds to 728. At 728 the data from the set of candidate pixels is included in the filtered depth image data 154.

Returning to 726, if the curvature of the set of candidate pixels is non-zero, the process proceeds to 730. At 730 the data associated with the set of candidate pixels is removed or omitted from the filtered depth image data 154. For example, the data for these pixels in the filtered depth image data 154 may be set to null, zero, or other specified values.

In some implementations the process may proceed from 710 to 730 without the use of candidate pixels and curvature testing. For example, operations 722 through 728 may be omitted.

Figure 8:
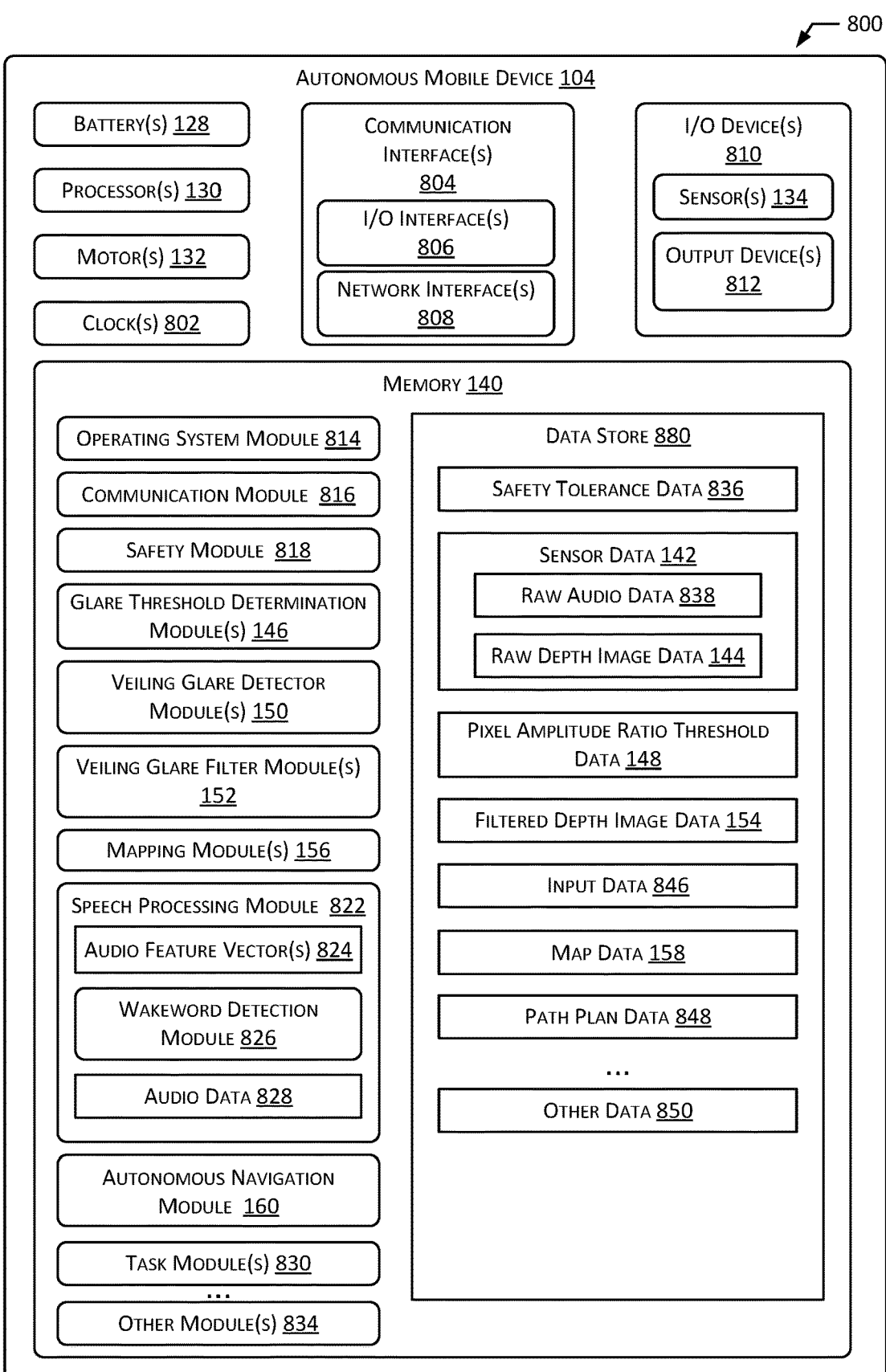
FIG. 8 is a block diagram of the components of the AMD, according to some implementations.

FIG. 8 is a block diagram 800 of the AMD 104, according to some implementations. The AMD 104 may include one or more batteries 128 to provide electrical power suitable for operating the components in the AMD 104. In some implementations, other devices may be used to provide electrical power to the AMD 104. For example, power may be provided by wireless power transfer, capacitors, fuel cells, storage flywheels, and so forth.

The AMD 104 may include one or more hardware processors 130 (processors) configured to execute one or more stored instructions. The processors 130 may comprise one or more cores. The processors 130 may include microcontrollers, systems on a chip, field programmable gate arrays, digital signal processors, graphic processing units, general processing units, and so forth.

The AMD 104 may include one or more motors 132, actuators, or other devices to cause the AMD 104 or a portion thereof to move. For example, the one or more motors 132 may operate one or more wheels, legs, and so forth to move the AMD 104 from a first location in the physical space 102 to a second location in the physical space 102.

One or more clocks 802 may provide information indicative of date, time, ticks, and so forth. For example, the processor 130 may use data from the clock 802 to associate a particular time with an action, sensor data 142, and so forth.

The AMD 104 may include one or more communication interfaces 804 such as input/output (I/O) interfaces 806, network interfaces 808, and so forth. The communication interfaces 804 enable the AMD 104, or components thereof, to communicate with other devices 176 or components. The communication interfaces 804 may include one or more I/O interfaces 806. The I/O interfaces 806 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 806 may couple to one or more I/O device 810. The I/O devices 810 may include input devices such as one or more of the sensor 134, keyboard, mouse, scanner, and so forth. The I/O devices 810 may also include output devices 812 such as one or more of a motor 132, light, speaker, display, projector, printer, and so forth. In some embodiments, the I/O devices 810 may be physically incorporated with the AMD 104 or may be externally placed. The sensors 134 and I/O devices 810 are discussed in more detail with regard to FIG. 9.

The AMD 104 may include one or more network interfaces 808. The network interfaces 808 may include devices to connect to personal area networks (PANs), local area networks (LANs), wireless local area networks (WLANS), wide area networks (WANs), and so forth. For example, the network interfaces 808 may include devices compatible with Ethernet, Wi-Fi, Bluetooth, Bluetooth Low Energy, ZigBee, and so forth.

The AMD 104 includes one or more memories 140. The memory 140 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 140 provides storage of computer-readable instructions, data structures, program modules, and other data for the operation of the AMD 104. A few example functional modules are shown stored in the memory 140, although the same functionality may alternatively be implemented in hardware, firmware, or as a system on a chip (SoC).

The memory 140 may include at least one operating system (OS) module 814. The OS module 814 is configured to manage hardware resource devices such as the I/O interfaces 806, the I/O devices 810, the communication interfaces 804, and provide various services to applications or modules executing on the processors 130. The OS module 814 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the Robot Operating System (ROS), and so forth.

Also stored in the memory 140 may be a data store 880 and one or more of the following modules. These modules may be executed as foreground applications, background tasks, daemons, and so forth. The data store 880 may use a flat file, database, linked list, tree, executable code, script, or other data structure to store information. In some implementations, the data store 880 or a portion of the memory 140 may be distributed across one or more other devices 176 including other AMDs 104, servers 180, network attached storage devices, and so forth.

A communication module 816 may be configured to establish communication with other devices 176, such as other AMDs 104, an external server 180, a docking station 182, and so forth. The communications may be authenticated, encrypted, and so forth.

Other modules within the memory 140 may include a safety module 818, the glare threshold determination module 146, the veiling glare detector module 150, the veiling glare filter module 152, the mapping module(s) 156, the autonomous navigation module 160, a speech processing module 822, one or more task modules 830, or other modules 834. The modules may access memory within the data store 880, including safety tolerance data 836, sensor data 142, pixel amplitude ratio threshold data 148, filtered depth image data 154, other data 850, and so forth.

The safety module 818 may access the safety tolerance data 836 to determine within what tolerances the AMD 104 may operate safely within the physical space 102. For example, the safety module 818 may be configured to stop the AMD 104 from moving when an extensible mast of the AMD 104 is extended. In another example, the safety tolerance data 836 may specify a minimum sound threshold which, when exceeded, stops all movement of the AMD 104. Continuing this example, detection of sound such as a human yell would stop the AMD 104. In another example, the safety module 818 may access safety tolerance data 836 that specifies a minimum distance from an object that the AMD 104 is to maintain. Continuing this example, when a sensor 134 detects an object has approached to less than or equal to the minimum distance, all movement of the AMD 104 may be stopped. Movement of the AMD 104 may be stopped by one or more of inhibiting operations of one or more of the motors 132, issuing a command to stop motor operation, disconnecting power from one or more the motors 132, and so forth. The safety module 818 may be implemented as hardware, software, or a combination thereof.

The safety module 818 may control other factors, such as a maximum speed of the AMD 104 based on information obtained by the sensors 134, precision and accuracy of the sensor data 142, and so forth. For example, detection of an object by an optical sensor may include some error, such as when the distance to the object comprises a weighted average between the object and a background. As a result, the maximum speed permitted by the safety module 818 may be based on one or more factors such as the weight of the AMD 104, nature of the floor, distance to the object, and so forth. In the event that the maximum permissible speed differs from the maximum speed permitted by the safety module 818, the lesser speed may be utilized.

The speech processing module 822 may be used to process utterances of the user. Microphones may acquire audio in the presence of the AMD 104 and may send raw audio data 838 to an acoustic front end (AFE). The AFE may transform the raw audio data 838 (for example, a single-channel, 16-bit audio stream sampled at 16 kHz), captured by the microphone, into audio feature vectors 824 that may ultimately be used for processing by various components, such as a wakeword detection module 826, speech recognition engine, or other components. The AFE may reduce noise in the raw audio data 838. The AFE may also perform acoustic echo cancellation (AEC) or other operations to account for output audio data that may be sent to a speaker of the AMD 104 for output. For example, the AMD 104 may be playing music or other audio that is being received from a network 178 in the form of output audio data. To avoid the output audio interfering with the device's ability to detect and process input audio, the AFE or other component may perform echo cancellation to remove the output audio data from the input raw audio data 838, or other operations.

The AFE may divide the raw audio data 838 into frames representing time intervals for which the AFE determines a number of values (i.e., features) representing qualities of the raw audio data 838, along with a set of those values (i.e., a feature vector or audio feature vector 824) representing features/qualities of the raw audio data 838 within each frame. A frame may be a certain period of time, for example a sliding window of 85 ms of audio data 828 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 838, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 824 (or the raw audio data 838) may be input into a wakeword detection module 826 that is configured to detect keywords spoken in the audio. The wakeword detection module 826 may use various techniques to determine whether audio data 828 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 826 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 826 may compare audio data 828 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 828 (which may include one or more of the raw audio data 838 or the audio feature vectors 824) to one or more server(s) 180 for speech processing. The audio data 828 corresponding to audio obtained by the microphone may be processed locally on one or more of the processors 130, sent to a server 180 for routing to a recipient device or may be sent to the server 180 for speech processing for interpretation of the included speech (either for purposes of enabling voice-communications and/or for purposes of executing a command in the speech). The audio data 828 may include data corresponding to the wakeword, or the portion of the audio data 828 corresponding to the wakeword may be removed by the AMD 104 before processing by the speech processing module 822, prior to sending to the server 180, and so forth.

The speech processing module 822 may include or access an automated speech recognition (ASR) module. The ASR module may accept as input raw audio data 838, audio feature vectors 824, or other sensor data 142 and so forth and may produce as output input data 846 comprising a text string or other data representation. The input data 846 comprising the text string or other data representation may be processed by the speech processing module 822 to determine the command to be executed. For example, the utterance of the command "robot, come here" may result in input data 846 comprising the text string "come here". The wakeword "robot" may be omitted from the input data 846.

The mapping module(s) 156 may use one or more simultaneous localization and mapping ("SLAM") techniques. The SLAM algorithms may utilize one or more of maps, algorithms, beacons, or other techniques to navigate. The autonomous navigation module 160 may use a navigation map to determine a set of possible paths along which the AMD 104 may move. One of these may be selected and used to determine path plan data 848 indicative of a path. For example, a possible path that is the shortest or has the fewest turns may be selected and used to determine the path. The path is then subsequently used to determine a set of commands that drive the motors 132 connected to the wheels. For example, the autonomous navigation module 160 may determine the current location within the physical space 102 and determine path plan data 848 that describes the path to a destination location such as the docking station 182.

The autonomous navigation module 160 may utilize various techniques during processing of sensor data 142. For example, image data obtained from cameras on the AMD 104 may be processed to determine one or more of corners, edges, planes, and so forth. In some implementations, corners may be detected, and the coordinates of those corners may be used to produce point cloud data. In another example the filtered depth image data 154 may be used to produce point cloud data. This point cloud data may then be used for SLAM or other purposes associated with mapping, navigation, and so forth.

The AMD 104 may move responsive to a determination made by an onboard processor 130, in response to a command received from one or more communication interfaces 804, as determined from the sensor data 142, and so forth. For example, an external server 180 may send a command that is received using the network interface 808. This command may direct the AMD 104 to proceed to find a particular user, follow a particular user, and so forth. The AMD 104 may then process this command and use the autonomous navigation module 160 to determine the directions and distances associated with carrying out the command. For example, the command to "come here" may result in the task module 830 sending a command to the autonomous navigation module 160 to move the AMD 104 to a particular location near the user and orient the AMD 104 in a particular direction.

The AMD 104 may connect to the network 178 using one or more of the network interfaces 808. In some implementations, one or more of the modules or other functions described here may execute on the processors 130 of the AMD 104, on the server 180, or a combination thereof. For example, one or more servers 180 may provide various functions, such as ASR, natural language understanding (NLU), providing content such as audio or video to the AMD 104, and so forth.

The other modules 834 may provide other functionality, such as object recognition, speech synthesis, user identification, and so forth. The other modules 834 may comprise a speech synthesis module that is able to convert text data to human speech. For example, the speech synthesis module may be used by the AMD 104 to provide speech that a user is able to understand.

The data store 880 may store the other data 850 as well. For example, localization settings may indicate local preferences such as language, user identifier data may be stored that allows for identification of a particular user, and so forth.

Modules described herein, such as the mapping module(s) 156, may provide various processing functions such as de-noising, filtering, and so forth. Processing of sensor data 142, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, California, USA; Willow Garage of Menlo Park, California, USA; and Itseez of Nizhny Novgorod, Russia. In another implementation, functions available in the OKAO machine vision library as promulgated by Omron Corporation of Kyoto, Japan, may be used to process the sensor data 142. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), deep CNNs (DCNNs), active appearance models (AAMs), active shape models (ASMs), principal component analysis (PCA), cascade classifiers, and so forth, may also be used to process the sensor data 142 or other data 850. For example, the ANN may be trained using a supervised learning algorithm such that object identifiers are associated with images of particular objects within training images provided to the ANN. Once trained, the ANN may be provided with the sensor data 142 and produce output indicative of the object identifier.

FIG. 9 is a block diagram 900 of some components of the AMD 104 such as network interfaces 808, sensors 134, and output devices 812, according to some implementations. The components illustrated here are provided by way of illustration and not necessarily as a limitation. For example, the AMD 104 may utilize a subset of the particular network interfaces 808, output devices 812, or sensors 134 depicted here, or may utilize components not pictured. One or more of the sensors 134, output devices 812, or a combination thereof may be included on a moveable component that may be panned, tilted, rotated, or any combination thereof with respect to a chassis of the AMD 104.

The network interfaces 808 may include one or more of a WLAN interface 902, PAN interface 904, secondary radio frequency (RF) link interface 906, or other interface 908. The WLAN interface 902 may be compliant with at least a portion of the Wi-Fi specification. For example, the WLAN interface 902 may be compliant with at least a portion of the IEEE 802.11 specification as promulgated by the Institute of Electrical and Electronics Engineers (IEEE). The PAN interface 904 may be compliant with at least a portion of one or more of the Bluetooth, wireless USB, Z-Wave, ZigBee, or other standards. For example, the PAN interface 904 may be compliant with the Bluetooth Low Energy (BLE) specification.

The secondary RF link interface 906 may comprise a radio transmitter and receiver that operate at frequencies different from or using modulation different from the other interfaces. For example, the WLAN interface 902 may utilize frequencies in the 8.4 GHz and 5 GHz Industrial Scientific and Medicine (ISM) bands, while the PAN interface 904 may utilize the 8.4 GHz ISM bands. The secondary RF link interface 906 may comprise a radio transmitter that operates in the 900 MHz ISM band, within a licensed band at another frequency, and so forth. The secondary RF link interface 906 may be utilized to provide backup communication between the AMD 104 and other devices 176 in the event that communication fails using one or more of the WLAN interface 902 or the PAN interface 904. For example, in the event the AMD 104 travels to an area within the physical space 102 that does not have Wi-Fi coverage, the AMD 104 may use the secondary RF link interface 906 to communicate with another device such as a specialized access point, docking station 182, or other AMD 104.

The other 908 network interfaces may include other equipment to send or receive data using other wavelengths or phenomena. For example, the other 908 network interface may include an ultrasonic transceiver used to send data as ultrasonic sounds, a visible light system that communicates by modulating a visible light source such as a light-emitting diode, and so forth. In another example, the other 908 network interface may comprise a wireless wide area network (WWAN) interface or a wireless cellular data network interface. Continuing the example, the other 908 network interface may be compliant with at least a portion of the LTE, 5G, 6G, or other standards.

The AMD 104 may include one or more of the following sensors 134. The sensors 134 depicted here are provided by way of illustration and not necessarily as a limitation. It is understood that other sensors 134 may be included or utilized by the AMD 104, while some sensors 134 may be omitted in some configurations.

A motor encoder 910 provides information indicative of the rotation or linear extension of a motor 132. The motor 132 may comprise a rotary motor, or a linear actuator. In some implementations, the motor encoder 910 may comprise a separate assembly such as a photodiode and encoder wheel that is affixed to the motor 132. In other implementations, the motor encoder 910 may comprise circuitry configured to drive the motor 132. For example, the autonomous navigation module 160 may utilize the data from the motor encoder 910 to estimate a distance traveled.

A suspension weight sensor 912 provides information indicative of the weight of the AMD 104 on the suspension system for one or more of the wheels or the caster. For example, the suspension weight sensor 912 may comprise a switch, strain gauge, load cell, photodetector 942, or other sensing element that is used to determine whether weight is applied to a particular wheel, or whether weight has been removed from the wheel. In some implementations, the suspension weight sensor 912 may provide binary data such as a "1" value indicating that there is a weight applied to the wheel, while a "0" value indicates that there is no weight applied to the wheel. In other implementations, the suspension weight sensor 912 may provide an indication such as so many kilograms of force or newtons of force. The suspension weight sensor 912 may be affixed to one or more of the wheels or the caster. In some situations, the safety module 818 may use data from the suspension weight sensor 912 to determine whether or not to inhibit operation of one or more of the motors 132. For example, if the suspension weight sensor 912 indicates no weight on the suspension, the implication is that the AMD 104 is no longer resting on its wheels, and thus operation of the motors 132 may be inhibited. In another example, if the suspension weight sensor 912 indicates weight that exceeds a threshold value, the implication is that something heavy is resting on the AMD 104 and thus operation of the motors 132 may be inhibited. For example, the threshold value may comprise a weight of a load that compresses a suspension system to a minimum height, or results in a mass that exceeds a torque output of the motors 132 to maintain a minimum acceleration.

One or more bumper switches 914 provide an indication of physical contact between a bumper or other member that is in mechanical contact with the bumper switch 914. The safety module 818 utilizes sensor data 142 obtained by the bumper switches 914 to modify the operation of the AMD 104. For example, if the bumper switch 914 associated with a front of the AMD 104 is triggered, the safety module 818 may drive the AMD 104 backwards.

A floor optical motion sensor (FOMS) 916 provides information indicative of motion of the AMD 104 relative to the floor or other surface underneath the AMD 104. In one implementation, the FOMS 916 may comprise a light source such as light-emitting diode (LED), an array of photodiodes, and so forth. In some implementations, the FOMS 916 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 916 may provide other information, such as data indicative of a pattern present on the floor, composition of the floor, color of the floor, and so forth. For example, the FOMS 916 may utilize an optoelectronic sensor that may detect different colors or shades of gray, and this data may be used to generate floor characterization data. The floor characterization data may be used for navigation.

An ultrasonic sensor 918 utilizes sounds in excess of 80 kHz to determine a distance from the sensor 134 to an object. The ultrasonic sensor 918 may comprise an emitter such as a piezoelectric transducer and a detector such as an ultrasonic microphone. The emitter may generate specifically timed pulses of ultrasonic sound while the detector listens for an echo of that sound being reflected from an object within the field of view 110. The ultrasonic sensor 918 may provide information indicative of a presence of an object, distance to the object, and so forth. Two or more ultrasonic sensors 918 may be utilized in conjunction with one another to determine a location within a two-dimensional plane of the object.

In some implementations, the ultrasonic sensor 918 or a portion thereof may be used to provide other functionality. For example, the emitter of the ultrasonic sensor 918 may be used to transmit data and the detector may be used to receive data transmitted that is ultrasonic sound. In another example, the emitter of an ultrasonic sensor 918 may be set to a particular frequency and used to generate a particular waveform such as a sawtooth pattern to provide a signal that is audible to an animal, such as a dog or a cat.

An optical sensor 920 may provide sensor data 142 indicative of one or more of a presence or absence of an object, a distance to the object, or characteristics of the object. The optical sensor 920 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 920 may utilize one or more sensing elements. For example, the optical sensor 920 may comprise a 4×4 array of light sensing elements. Each individual sensing element may be associated with a field of view (FOV) 110 that is directed in a different way. For example, the optical sensor 920 may have four light sensing elements, each associated with a different 10° FOV 110, allowing the sensor to have an overall FOV 110 of 40°.

In another implementation, a structured light pattern may be provided by the optical emitter. A portion of the structured light pattern may then be detected on the object using a sensor 134 such as an image sensor or camera 944. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 920 may operate as a depth camera, providing a two-dimensional image of a scene, as well as data that indicates a distance to each pixel.

The sensors 134 may include the iTOF sensor 136. The iTOF sensor 136 may comprise a light source or emitter and a camera 944 to detect light reflected by objects in the scene. The iTOF sensor 136 may determine a phase difference between an emitted phase and an observed phase. Based on the phase difference, an observed distance may be determined.

Data from the iTOF sensor 136 may be used by various modules. For example, the autonomous navigation module 160 may utilize the filtered depth image data 154 for localization of the AMD 104 within the physical space 102. In another example, the filtered depth image data 154 may be utilized for collision avoidance.

A lidar 922 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 142 may be generated that is indicative of the presence of objects and the relative positions, shapes, and so forth that are visible to the lidar 922. Data from the lidar 922 may be used by various modules. For example, the autonomous navigation module 160 may utilize point cloud data generated by the lidar 922 for localization of the AMD 104 within the physical space 102.

The AMD 104 may include an extensible mast. A mast position sensor 924 provides information indicative of a position of the mast of the AMD 104. For example, the mast position sensor 924 may comprise limit switches associated with the mast extension mechanism that indicate whether the mast is at an extended or retracted position. In other implementations, the mast position sensor 924 may comprise an optical code on at least a portion of the mast that is then interrogated by an optical emitter and a photodetector 942 to determine the distance to which the mast is extended. In another implementation, the mast position sensor 924 may comprise an encoder wheel that is attached to a mast motor that is used to raise or lower the mast. The mast position sensor 924 may provide data to the safety module 818. For example, if the AMD 104 is preparing to move, data from the mast position sensor 924 may be checked to determine if the mast is retracted, and if not, the mast may be retracted prior to beginning movement.

A mast strain sensor 926 provides information indicative of a strain on the mast with respect to the remainder of the AMD 104. For example, the mast strain sensor 926 may comprise a strain gauge or load cell that measures a side-load applied to the mast or a weight on the mast or downward pressure on the mast. The safety module 818 may utilize sensor data 142 obtained by the mast strain sensor 926. For example, if the strain applied to the mast exceeds a threshold amount, the safety module 818 may direct an audible and visible alarm to be presented by the AMD 104.

The AMD 104 may include a modular payload bay. A payload weight sensor 928 provides information indicative of the weight associated with the modular payload bay. The payload weight sensor 928 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 928 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 928 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 818 may utilize the payload weight sensor 928 to determine if the modular payload bay has been overloaded. If so, an alert or notification may be issued.

One or more device temperature sensors 930 may be utilized by the AMD 104. The device temperature sensors 930 provide temperature data of one or more components within the AMD 104. For example, a device temperature sensor 930 may indicate a temperature of one or more of the batteries 128, one or more motors 132, and so forth. In the event the temperature exceeds a threshold value, the component associated with that device temperature sensor 930 may be shut down. For example, the threshold value may be determined based on component specifications, such as a maximum permissible temperature of the batteries 128.

One or more interlock sensors 932 may provide data to the safety module 818 or other circuitry that prevents the AMD 104 from operating in an unsafe condition. For example, the interlock sensors 932 may comprise switches that indicate whether an access panel is open. The interlock sensors 932 may be configured to inhibit operation of the AMD 104 until the interlock switch indicates a safe condition is present.

A gyroscope 934 may provide information indicative of rotation of an object affixed thereto. For example, a gyroscope 934 may generate sensor data 142 that is indicative of a change in orientation of the AMD 104 or a portion thereof.

An accelerometer 936 provides information indicative of a direction and magnitude of an imposed acceleration. Data such as rate of change, determination of changes in direction, speed, and so forth may be determined using the accelerometer 936. The accelerometer 936 may comprise mechanical, optical, micro-electromechanical, or other devices. For example, the gyroscope 934 in the accelerometer 936 may comprise a prepackaged solid-state inertial measurement unit (IMU) that provides multiple axis gyroscopes 934 and accelerometers 936.

A magnetometer 938 may be used to determine an orientation by measuring ambient magnetic fields, such as the terrestrial magnetic field. For example, the magnetometer 938 may comprise a Hall effect transistor that provides output compass data indicative of a magnetic heading.

The AMD 104 may include one or more location sensors 940. The location sensors 940 may comprise an optical, radio, or other navigational system such as a global navigation satellite system (GNSS) receiver such as a global positioning system (GPS). For indoor operation, the location sensors 940 may comprise indoor position systems, such as using Wi-Fi Positioning Systems (WPS). The location sensors 940 may provide information indicative of a relative location, such as "living room" or an absolute location such as particular coordinates indicative of latitude and longitude, or displacement with respect to a predefined origin.

A photodetector 942 provides sensor data 142 indicative of impinging light. For example, the photodetector 942 may provide data indicative of a color, intensity, duration, and so forth.

A camera 944 generates sensor data 142 indicative of one or more images. The camera 944 may be configured to detect light in one or more wavelengths including, but not limited to, terahertz, infrared, visible, ultraviolet, and so forth. For example, an infrared camera 944 may be sensitive to wavelengths between approximately 800 nanometers and 1 millimeter. The camera 944 may comprise charge coupled devices (CCD), complementary metal oxide semiconductor (CMOS) devices, microbolometers, and so forth. The AMD 104 may use image data acquired by the camera 944 for object recognition, navigation, collision avoidance, user communication, and so forth. For example, a pair of cameras 944 sensitive to infrared light may be mounted on the front of the AMD 104 to provide binocular stereo vision, with the sensor data 142 comprising images being sent to the autonomous navigation module 160. In another example, the camera 944 may comprise a 10 megapixel or greater camera that is used for videoconferencing or for acquiring pictures for the user.

The camera 944 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 944, particularly those associated with navigation or autonomous operation, may utilize a global shutter. In other implementations, the camera(s) 944 providing images for use by the autonomous navigation module 160 may be acquired using a rolling shutter and subsequently may be processed to mitigate image artifacts.

One or more microphones 946 may be configured to acquire information indicative of sound present in the physical space 102. In some implementations, arrays of microphones 946 may be used. These arrays may implement beamforming techniques to provide for directionality of gain. The AMD 104 may use the one or more microphones 946 to acquire information from acoustic tags, accept voice input from users, determine a direction of an utterance, determine ambient noise levels, for voice communication with another user or system, and so forth.

An air pressure sensor 948 may provide information indicative of an ambient atmospheric pressure or changes in ambient atmospheric pressure. For example, the air pressure sensor 948 may provide information indicative of changes in air pressure due to opening and closing of doors, weather events, and so forth.

An air quality sensor 950 may provide information indicative of one or more attributes of the ambient atmosphere. For example, the air quality sensor 950 may include one or more chemical sensing elements to detect the presence of carbon monoxide, carbon dioxide, ozone, and so forth. In another example, the air quality sensor 950 may comprise one or more elements to detect particulate matter in the air, such as a photoelectric detector, ionization chamber, and so forth. In another example, the air quality sensor 950 may include a hygrometer that provides information indicative of relative humidity.

An ambient light sensor 952 may comprise one or more photodetectors 942 or other light-sensitive elements that are used to determine one or more of the color, intensity, or duration of ambient lighting around the AMD 104.

An ambient temperature sensor 954 provides information indicative of the temperature of the ambient physical space 102 proximate to the AMD 104. In some implementations, an infrared temperature sensor may be utilized to determine the temperature of another object at a distance.

A floor analysis sensor 956 may include one or more components that are used to generate at least a portion of floor characterization data. In one implementation, the floor analysis sensor 956 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 956 may be used by one or more of the safety module 818, the autonomous navigation module 160, the task module 830, and so forth. For example, if the floor analysis sensor 956 determines that the floor is wet, the safety module 818 may decrease the speed of the AMD 104 and generate a notification alerting the user.

The floor analysis sensor 956 may include other components as well. For example, a coefficient of friction sensor may comprise a probe that comes into contact with the surface and determines the coefficient of friction between the probe and the floor.

A caster rotation sensor 958 provides data indicative of one or more of a direction of orientation, angular velocity, linear speed of the caster, and so forth. For example, the caster rotation sensor 958 may comprise an optical encoder and corresponding target that is able to determine that the caster transitioned from an angle of 0° at a first time to 49° at a second time.

The sensors 134 may include a radar 960. The radar 960 may be used to provide information as to a distance, lateral position, and so forth, to an object.

The sensors 134 may include a passive infrared (PIR) sensor 962. The PIR sensor 962 may be used to detect the presence of users, pets, hotspots, and so forth. For example, the PIR sensor 962 may be configured to detect infrared radiation with wavelengths between 9 and 14 micrometers.

The AMD 104 may include other sensors 964 as well. For example, a capacitive proximity sensor may be used to provide proximity data to adjacent objects. Other sensors 964 may include radio frequency identification (RFID) readers, near field communication (NFC) systems, coded aperture cameras, and so forth. For example, NFC tags may be placed at various points within the physical space 102 to provide landmarks for the autonomous navigation module 160. One or more touch sensors may be utilized to determine contact with a user or other objects.

The AMD 104 may include one or more output devices 812. A motor 132 may be used to provide linear or rotary motion. A light 982 may be used to emit photons. A speaker 984 may be used to emit sound. A display 986 may comprise one or more of a liquid crystal display, light emitting diode display, electrophoretic display, cholesteric liquid crystal display, interferometric display, and so forth. The display 986 may be used to present visible information such as graphics, pictures, text, and so forth. In some implementations, the display 986 may comprise a touchscreen that combines a touch sensor and a display 986.

In some implementations, the AMD 104 may be equipped with a projector 988. The projector 988 may be able to project an image on a surface, such as the floor, wall, ceiling, and so forth.

A scent dispenser 990 may be used to emit one or more smells. For example, the scent dispenser 990 may comprise a plurality of different scented liquids that may be evaporated or vaporized in a controlled fashion to release predetermined amounts of each.

One or more moveable component actuators 992 may comprise an electrically operated mechanism such as one or more of a motor 132, solenoid, piezoelectric material, electroactive polymer, shape-memory alloy, and so forth. An actuator controller may be used to provide a signal or other input that operates one or more of the moveable component actuators 992 to produce movement of the moveable component.

In other implementations, other 994 output devices may be utilized. For example, the AMD 104 may include a haptic output device that provides output that produces particular touch sensations to the user. Continuing the example, a motor 132 with an eccentric weight may be used to create a buzz or vibration to allow the AMD 104 to simulate the purr of a cat.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD), the AMD comprising:
   an indirect time of flight (iTOF) sensor comprising a light source and a sensor;
   one or more memories storing computer-executable instructions; and
   one or more processors to execute the computer-executable instructions to:
      acquire first data comprising a plurality of pixels, wherein each pixel of the plurality of pixels comprises data indicative of:
         an amplitude of reflected light detected by the sensor, wherein the reflected light is a reflection of light emitted by the light source, and
         a distance based on a phase difference between the light emitted by the light source and the reflected light detected by the sensor;
      determine, using the first data, a first percentage of the plurality of pixels that:
         indicate an amplitude greater than a first threshold amplitude, and
         indicate a distance that is less than a first threshold distance;
      determine the first percentage is greater than a first threshold percentage;
      determine second data based on:
         filtering individual pixels of the plurality of pixels using pixel amplitude ratio threshold data; and
      operate the AMD based on the second data.

2. The AMD of claim 1, wherein the one or more processors further execute the computer-executable instructions to:
   determine a first set of pixels of the plurality of pixels that:
      indicate an amplitude greater than a second threshold amplitude, and
      indicate a distance that is less than a second threshold distance;
   determine an average distance based on the distances indicated by the first set of pixels; and
   retrieve the pixel amplitude ratio threshold data based on the average distance.

3. The AMD of claim 1, wherein the one or more processors further execute the computer-executable instructions to:
   retrieve an amplitude scaling factor that is associated with the iTOF sensor;
   determine a first set of pixels of the plurality of pixels that:
      indicate an amplitude greater than a second threshold amplitude, and
      indicate a distance that is less than a second threshold distance;
   determine an average amplitude based on the amplitudes indicated by the first set of pixels;
   determine, based on the average amplitude and the amplitude scaling factor, an estimated veiling glare amplitude; and
   wherein the filtering is based at least in part on the estimated veiling glare amplitude.

4. The AMD of claim 1, wherein the one or more processors further execute the computer-executable instructions to:
   determine, for a pixel of the plurality of pixels:
      a first ratio based on the amplitude indicated by the pixel and an estimated veiling glare amplitude, and
      a pixel amplitude ratio threshold value for the pixel retrieved from the pixel amplitude ratio threshold data; and
   determine the second data based on a comparison of the first ratio to the pixel amplitude ratio threshold value.

5. The AMD of claim 4, wherein the pixel amplitude ratio threshold data comprises:
   a first pixel amplitude ratio threshold value that is associated with a first distance error value and a first distance; and
   a second pixel amplitude ratio threshold value that is associated with a second distance error value and a second distance.

6. The AMD of claim 4, wherein the one or more processors further execute the computer-executable instructions to:
   determine the first ratio is greater than or equal to the pixel amplitude ratio threshold value; and
   store the amplitude and distance associated with the pixel as a portion of the second data.

7. The AMD of claim 4, wherein the one or more processors further execute the computer-executable instructions to:
   determine a first set of pixels, wherein each pixel of the first set of pixels has the respective first ratio less than the respective pixel amplitude ratio threshold value;
   determine, based on distances associated with the first set of pixels, a curvature of the first set of pixels is zero; and
   store the amplitudes and distances of the first set of pixels as a portion of the second data.

8. The AMD of claim 7, wherein the one or more processors further execute the computer-executable instructions to:
   determine the first set of pixels are one or more of:
      within a threshold pixel distance of one another, or
      adjacent to one another.

9. The AMD of claim 4, wherein the one or more processors further execute the computer-executable instructions to:
   determine a first set of pixels, wherein each pixel of the first set of pixels has the respective first ratio that is less than the respective pixel amplitude ratio threshold value;

determine, based on distances associated with the first set of pixels, a curvature of the first set of pixels is not zero; and wherein the second data does not include the amplitudes and distances of the first set of pixels.

10. A method comprising:

determining first data comprising a plurality of pixels, wherein each pixel comprises data indicative of an amplitude and a distance;

determining a first percentage of the plurality of pixels that:

have an amplitude greater than a first threshold amplitude, and have a distance that is less than a first threshold distance;

determining the first percentage is greater than a first threshold percentage; and determining second data based on filtering individual pixels of the plurality of pixels using pixel amplitude ratio threshold data.

11. The method of claim 10, further comprising:

determining, for a pixel of the plurality of pixels:

a first ratio based on the amplitude indicated by the pixel and an estimated veiling glare amplitude, and a pixel amplitude ratio threshold value for the pixel retrieved from the pixel amplitude ratio threshold data; and determining the second data based on a comparison of the first ratio to the pixel amplitude ratio threshold value.

12. The method of claim 11, further comprising:

determining the first ratio is greater than or equal to the pixel amplitude ratio threshold value; and storing the amplitude and distance of the pixel as a portion of the second data.

13. The method of claim 11, further comprising:

determining a first set of pixels, wherein each pixel of the first set of pixels has the respective first ratio less than the respective pixel amplitude ratio threshold value;

determining, based on distances associated with the first set of pixels, a curvature of the first set of pixels is zero; and storing the amplitudes and distances of the first set of pixels as a portion of the second data.

14. The method of claim 13, wherein each pixel of the first set of pixels are one or more of:

within a threshold pixel distance of one another, or adjacent to one another.

15. A device comprising:

an indirect time of flight (iTOF) sensor;

one or more memories storing computer-executable instructions; and one or more processors to execute the computer-executable instructions to:

acquire first data comprising a plurality of pixels, wherein each pixel of the plurality of pixels comprises data indicative of an amplitude and a distance;

determine, based on the amplitudes and the distances of the plurality of pixels, a first value;

based on the first value, determine second data based on filtering individual pixels of the plurality of pixels using pixel amplitude ratio threshold data; and operate the device based on the second data.

16. The device of claim 15, wherein the one or more processors further execute the computer-executable instructions to:

determine the first value that is indicative of a first percentage of the plurality of pixels that:

have an amplitude greater than a first threshold amplitude, and have a distance that is less than a first threshold distance.

17. The device of claim 15, wherein the one or more processors further execute the computer-executable instructions to:

determine, for a pixel of the plurality of pixels:

a first ratio based on the amplitude indicated by the pixel and an estimated veiling glare amplitude, and a pixel amplitude ratio threshold value for the pixel retrieved from the pixel amplitude ratio threshold data; and determine the second data based on a comparison of the first ratio to the pixel amplitude ratio threshold value.

18. The device of claim 17, wherein the one or more processors further execute the computer-executable instructions to:

determine the first ratio is greater than or equal to the pixel amplitude ratio threshold value; and store the amplitude and distance of the pixel as a portion of the second data.

19. The device of claim 17, wherein the one or more processors further execute the computer-executable instructions to:

determine a first set of pixels, wherein each pixel of the first set of pixels has the respective first ratio less than the respective pixel amplitude ratio threshold value;

determine, based on distances associated with the first set of pixels, a curvature of the first set of pixels is zero; and store the amplitudes and distances of the first set of pixels as a portion of the second data.

20. The device of claim 17, wherein the one or more processors further execute the computer-executable instructions to:

determine a first set of pixels, wherein each pixel of the first set of pixels has the respective first ratio less than the respective pixel amplitude ratio threshold value;

determine, based on distances associated with the first set of pixels, a curvature of the first set of pixels is not zero; and wherein the second data does not include the amplitudes and distances of the first set of pixels.

* * * * *